United States Patent [19]

Bridges

[11] Patent Number: 4,938,288
[45] Date of Patent: Jul. 3, 1990

[54] NON-DAMAGING WORKOVER AND COMPLETION FLUID

[75] Inventor: Kenneth L. Bridges, Breaux Bridge, La.

[73] Assignee: OSCA, Inc., Lafayette, La.

[21] Appl. No.: 348,042

[22] Filed: May 5, 1989

[51] Int. Cl.$^5$ .............. E21B 43/00; E21B 43/25; E21B 43/27

[52] U.S. Cl. .............. 166/305.1; 166/307; 166/371; 252/8.551; 252/8.553

[58] Field of Search ........... 166/276, 278, 291, 297, 166/298, 305.1, 307, 312, 371; 252/8.551, 8.552, 8.553

[56] References Cited

U.S. PATENT DOCUMENTS

| | | | |
|---|---|---|---|
| 3,122,203 | 2/1964 | Hawkins | 166/305.1 |
| 4,083,407 | 4/1978 | Griffin, Jr. et al. | 166/291 |
| 4,292,183 | 9/1981 | Sanders | 252/8.551 |
| 4,304,677 | 12/1981 | Stauffer et al. | 252/8.551 |
| 4,784,779 | 11/1988 | Dadgar | 252/8.551 |

Primary Examiner—George A. Suchfield
Attorney, Agent, or Firm—Kirkland & Ellis

[57] ABSTRACT

The present invention relates to a method of preventing potential subterranean formation damage caused by calcium based completion and well servicing brines.

6 Claims, 7 Drawing Sheets

RETURN PERMEABILITY VS.
VOLUME OF REFERENCE BRINE
INJECTED TO DISPLACE HEAVY BRINES

RETURN PERMEABILITY VS.
VOLUME OF REFERENCE BRINE
INJECTED TO DISPLACE HEAVY BRINES

RETURN PERMEABILITY RATIO
VS. VOLUME OF DISPLACEMENT

RETURN PERMEABILITY RATIO
VS. VOLUME OF DISPLACEMENT $E_{CORR} \pm 20$ mv (S.C.E.)
a - 14.2 PPG CaBr₂ STOCK, pH=6.35, T=150°F
b - 14.2 PPG CaBr₂ HAc pH=4.05, T=150°F
c - 14.2 PPG CaBr₂ HAc +INHIBITOR, pH=4.05, T=150°F

POLORIZATION RESISTANCE CURVES $E_{CORR} \pm 20\,mv.(S.C.E)$
1-14.2 PPG $CaBr_2$ STOCK, pH=6.35, T=150°F

TAFFEL PLOT $E_{CORR} \pm 20 mV (S.C.E)$
b-14.2 PPG $CaBr_2$ + HAC pH=4.05, T=150°F

TAFFEL PLOT $E_{CORR} \pm 20mv.$ (S.C.E.)
C-14.2 PPG $CaBr_2$ + HAC + INHIBITOR pH=4.05, T=150°F

TAFFEL PLOT

NON-DAMAGING WORKOVER AND COMPLETION FLUID

BACKGROUND OF THE INVENTION

1. Field of the Invention

This invention relates to a process for reducing potential subterranean formation damage in pore spaces when clear completion fluids are used.

2. Description of the Art

Aqueous solutions of alkali and alkaline earth metals and mixtures thereof, are used as drilling, completion, packer and perforating media in oil and gas wells. The advent of the so-called solids free brines in recent years has greatly improved the completion and workover activities by eliminating formation plugging and solids settling problems previously encountered when water base and oil base drilling fluids were used. Clear brines are generally considered to be useful fluids for well servicing or completion of oil and gas wells because they are (1) free of solids, (2) inhibit swelling ard dispersion of clays in porous media and (3) do not change the wetability of subterranean formations. Despite these positive attributes, it has been shown that clear high density brines may cause damage to subterranean formations.

The possibility and degree of formation damage depends upon four factors. The four factors are (1) the chemical nature and density of the brines, (2) the physical and chemical nature of clays lining the pores, (3) the average formation pore pressure and (4) the compatibility of fluids present in the formation with the completion brine.

Depending upon their chemical make up, clear, high density brines interact with subterranean formations containing carbon dioxide. If the brine contains calcium, the reaction will result in carbonate precipitates, which may block pores in the subterranean formation. To date, the only solution to the formation of calcium precipitates has been the avoidance of the use of calcium brines when carbon dioxide is present.

Corley, et al., have addressed the problem of damage by clear brines in "Clear Fluids: They're Not Always Non-Damaging", World Oil, November 1984, p. 66-69. To minimize formation damage, the article suggests using a solids laden polymer-carbonate fluid.

Morgenthaler, in "Formation Damage Tests of High-Density Brine Completion Fluids", Society of Petroleum Engineers Production Engineering November 1986, p. 432-36 notes that formation damage occurs when trines having a density of 13.4-14.9 lbm/gal are used. According to Morgenthaler, highly concentrated brines containing calcium broxide or calcium chloride cause damage which he postulates may be due to the precipitation of an acid soluble calcium salt. The author recommends using zinc bromide to prevent formation impairment.

Calcium free systems such as sodium bromide, sodium chloride or zinc bromide solutions have been used to avoid subterranean formation damage. Although zinc carbonates are also insoluable, zinc carbonates do not usually form. The principle disadvantage of these systems is either the inability to achieve the desired fluid density or the unfavorable economics associated with these special fluids.

Accordingly, a primary objective of the present invention is to design a process to prevent subterranean damage when clear, high density brines are used in oil and gas well applications.

Another object of the invention is to inhibit the interaction of clear high density brines with the subterranean formation matrix in order to prevent formation damage.

Yet another object of the invention is to prevent the formation of precipitates due to the reaction between the clear high density brines and substances found in the subterranean formation.

SUMMARY OF THE INVENTION

The foregoing and other objects, advantages and features of the invention may be achieved by a method of preventing subterranean formation damage by stabilizing the pH of the clear completion fluid. The pH of the clear, high density brine is established by the addition of a buffer composition. The buffer composition comprises a weak acid with its conjugate metal salt.

DETAILED DESCRIPTION OF THE INVENTION

Figure 1:
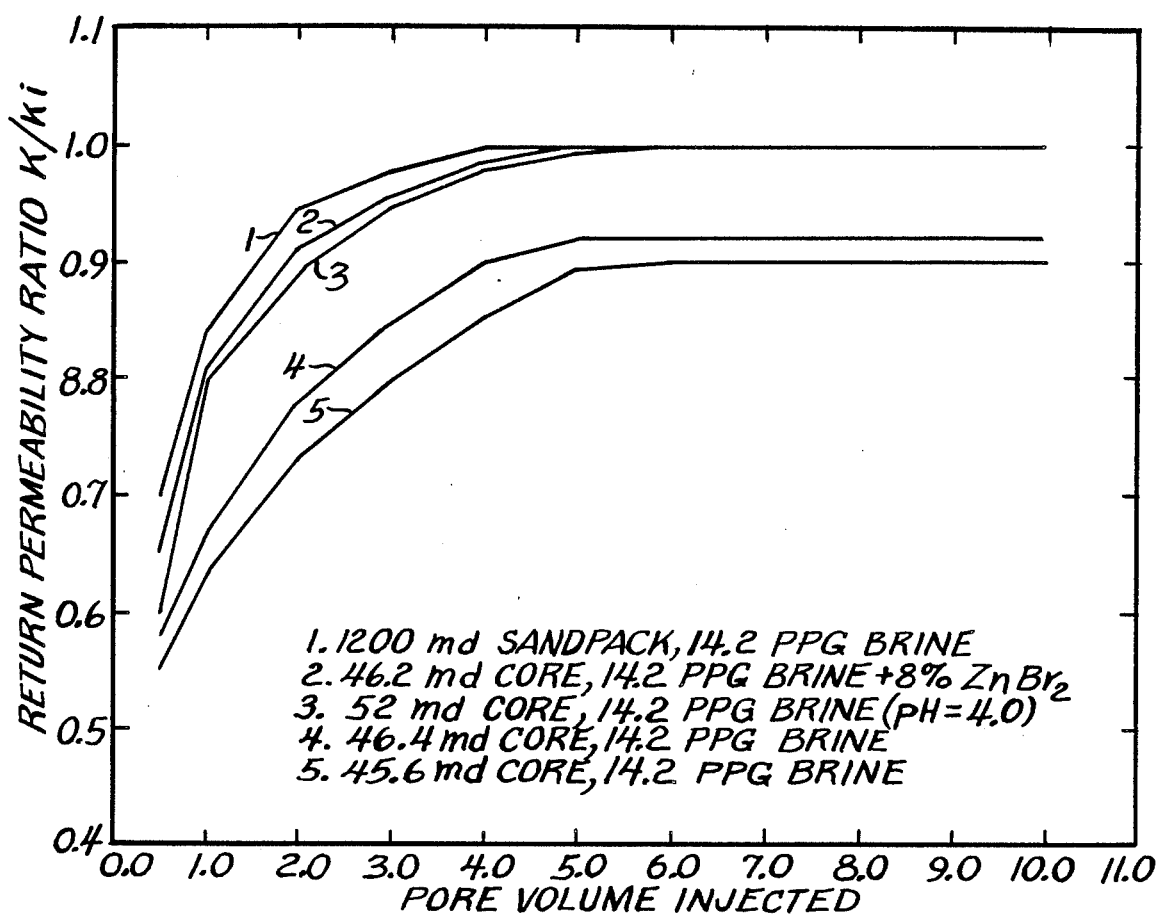
FIG. 1 shows the relationship between the return permeability and volume of the reference brine injected to displace heavy brine.

The invention relates to a method of preventing subterranean formation damage when calcium based brines are introduced into subterranean formations containing carbon dioxide and other detrimental interactive agents which may result in precipitation and blockage of pores in the formation. The method comprises adding an acidic buffer composition to the brine and maintaining the pH of the composition between 5.5 and 3.5.

The acidic buffer composition comprises a weak acid and its conjugate metal salt. Possible buffer compositions include acetic acid with its complimentary salt, a soluble metal acetate. Preferred acids and metal salts include acetic acid/sodium acetate, acetic acid/calcium acetate, and citric acid/sodium citrate. Other buffer compositions may be used so long as a true solution is formed and the resulting pH ranges from about 4-5.

The amount of buffer composition required to effectuate the desired pH will range from approximately 1 to about 10 gallons of buffer solution per 4200 gallons of brine. The actual amount of buffer required is dependent on multiple factors including the composition of the buffer, and the composition of the brine. However, the typical amount of buffer ranges approximately from 4 to about 6 gallons per 4200 gallons of brine.

The following examples are provided for the purpose of illustration of the preferred embodiments of the present invention and are not intended to the limitations on the disclosed invention.

EXAMPLES

Example 1

In order to show the effect of low pH buffer in reducing subterranean formation daxage by high density brines, flow tests were conducted in Berea cores, naturally occurring sandstone used for standard studies of permeability, and in 1200 millidarcy (md.) sand packs.

Berea cores used in these tests had a 3 inch length and air permeability of 100 md. The average pore volume of these cores was about 9 cubic centimeters. These cores did not have any expandable clays.

The sandpack utilized in these tests contained 100–200 mesh Ottawa sand. The sandpack was prepared by standard wet packing technique.

Commercial grade hydrated calcium and zinc containing fluids of 14.2 pounds per gallon (ppg) and 19.2 ppg were used in the flow tests. A 4 percent reference brine was prepared from reagent grade sodium chloride. All prepared fluids were then filtered through 0.45 micron, membrane filter paper.

The flow tests were conducted through the prepared cores which were placed in a Hassler Core Holder at 150° C. A positive displacement pump was used to inject the fluid at a constant rate. Nitrogen was used as a medium for the fluid in order to ensure that the fluid was injected at a constant pressure. The cores were confined at 1000 pounds per square inch (psi) with a back pressure of 200 psi.

The cores were initially prepared by being saturated with the reference brine (4 percent sodium chloride solution), in a high vacuum desiccator for more than 72 hours. Subsequently, the cores were mounted in the Hassler Core Holder. The initial permeability of the core was measured by injecting the reference brine at a constant rate of 20 cubic centimeters per hour for more than 12 hours. A stabilized pressure differential was recorded for at least six (6) hours. High density brine was then injected at a very slow rate, approximately 5–10 cubic centimeters/hour at a constant pressure for a minimum of 24 hours. The reference brine was then reinjected at a constant rate of 20 cubic centimeters until a stabilized permeability was established. The ratio of final to initial permeability was calculated and the results are presented in Table 1.

TABLE 1

| | | Return Permeability in Single Phase Flow Tests | | | |
|---|---|---|---|---|---|
| Core Type | Ki* (md) | Test Brine (ppg) | Exposure Time | Return Permeability Ratio | Effluent pH |
| Sandpack | 1200 | 14.2 | 36 hours | 1.0 | — |
| Sandpack | 1200 | 14.2[4] | 36 hours | 1.0 | — |
| Berea | 46.4 | 14.2 | 24 hours | .920 | — |
| Berea | 45.6 | 14.2 | 24 hours | .90 | 6.6 |
| Berea | 50.9 | 14.2[1] | 24 hours | .95 | 5.9 |
| Berea | 52 | 14.2[2] | 24 hours | 1.0 | 4.9 |
| Berea | 52 | 14.2[3] | 24 hours | 1.0 | 5.50 |
| Berea | 46.2 | 14.2[4] | 24 hours | 1.0 | 5.45 |
| Berea | 58.8 | 15.0[5] | 24 hours | .92 | 5.85 |
| Berea | 46.6 | 15.0[6] | 24 hours | 1.0 | 4.86 |
| Berea | 41.0 | 14.8[6] | 24 hours | .99 | 4.75 |

*permeability to 4% NaCl solution
[1]CaBr$_2$, pH adjusted by glacial acetic acid to 5.5
[2]CaBr$_2$, pH adjusted by glacial acetic acid to 4.0
[3]CaBr$_2$ + 19.2 lbm/gal. (CaBr$_2$ + ZnBr$_2$) solution so that it may contain 8% ZnBr$_2$; pH = 5.50
[4]CaBr$_2$ + 8% ZnBr$_2$ (commercial grade dry salt), pH 5.45.
[5]CaCl$_2$/CaBr$_2$ Brine
[6]CaCl$_2$/CaBr$_2$ Brine, pH adjusted to 4.10 by buffer solution of glacial acetic acid and sodium acetate.

FIG. 1 shows the relationship between the return permeability and the volume of the reference brine injected to displace the high density brine. This figure shows that in all cases maximum return permeability was achieved after injection of 5 pore volumes.

The data in Table 1 and FIG. 1 indicate that the maximum loss of permeability is approximately 10 percent. This loss in permeability is possibly due either to the movement of clay particles or to deposition of fine particles in the pores which may be generated by interaction of brine and core matrix during the flow of brine through the core.

The data generated by the flow experiments through the sand packs indicate there is no reduction in permeability of unconsolidated sand packs of 1200 md.

In addition, the test results indicate that there is no loss in permeability even after the flow of brines occurs for 24 hours at 150° F., if the pH of the brine is lowered by glacial acetic acid or by 8 weight percent zinc bromide salt. It should be noted that the pH of the effluent is increased in tests where the pH of the brine is adjusted by unbuffered acid but does not increase when zinc bromide has been added. This effect is due to the natural buffering action and the large amount of zinc bromide added, as compared to the acid, which provides sufficient buffering to prevent an increase in pH. The test results indicate that any brine matrix interaction is prevented as long as the pH of the brine in the pores is maintained between 5.5 and 3.5.

It can be concluded from this example that one can avoid formation damage by maintaining the pH of the high density brines at about 4. This is readily accomplished with an acidic buffer solution. The preferred acidic buffer solution is an acetic acid buffer. In the most preferred form, the buffer comprises an equal molar mixture of acetic acid/sodium acetate.

Example 2

Flow tests were performed using three one inch core plugs obtained from a well in the Jolliet Field, Offshore, La.

Commercial grade high density brines were used in the flow tests. A reference brine comprising four percent (4%) by weight of sodium chloride was prepared from reagent grade sodium chloride. Both the high density brines and the reference brine were filtered through a 0.45 micron filter paper.

The flow tests were conducted in cores which had previously been saturated with reference brine: (4% sodium chloride solution). The saturated cores were stored in a high vacuum desiccator for more that 72 hours. The cores were then placed in a Hassler Core Holder at 150° C. In order to remove traces of mud and oil from the plugs, first 50 cubic centimeters of 4% brine and then 20 cubic centimeters of glycol ether were injected. The initial permeability of the core was measured by injecting the reference brine at a constant rate of 20 cubic centimeters/hour for more than 12 hours. A stabilized pressure differential was recorded for at least 6 hours. High density brine was then injected at very slow rates to ensure a constant rate of flow in a range of 5–10 cubic centimeters/hour at constant pressure for a minimum of 14 hours. The reference brine was reinjected at a constant rate of 20 cubic centimeters/hour until a stabilized permeability was established. The ratio of final to initial permeability of the core was calculated and the results are presented in Table 2.

TABLE 2

| | | Return Permeability in Single Phase Flow Tests | | | |
|---|---|---|---|---|---|
| Well | Core Depth (ft) | Ki* Test (md) | Brine (ppg) | Exposure Time (hours) | Return Permeability Ratio |
| GC184#1 | 9247.6 | 430 ± 10 | 14.2[1] | 24 | 1.0 |
| | | | 14.47[2] | 24 | 1.0 |

TABLE 2-continued

Return Permeability in Single Phase Flow Tests

| Well | Core Depth (ft) | Ki* Test (md) | Brine (ppg) | Exposure Time (hours) | Return Permeability Ratio |
|---|---|---|---|---|---|
| | | | 11.70[3] | 24 | 1.0 |
| GC184#7 | 6815.0 | 11 ± .2 | 14.2[1] | 24 | .99 |
| | | | 14.47[2] | 24 | .80 |
| GC184#7 | 6312.4 | 604 ± 15 | 14.7[2] | 24 | 1.0 |

Figure 2:
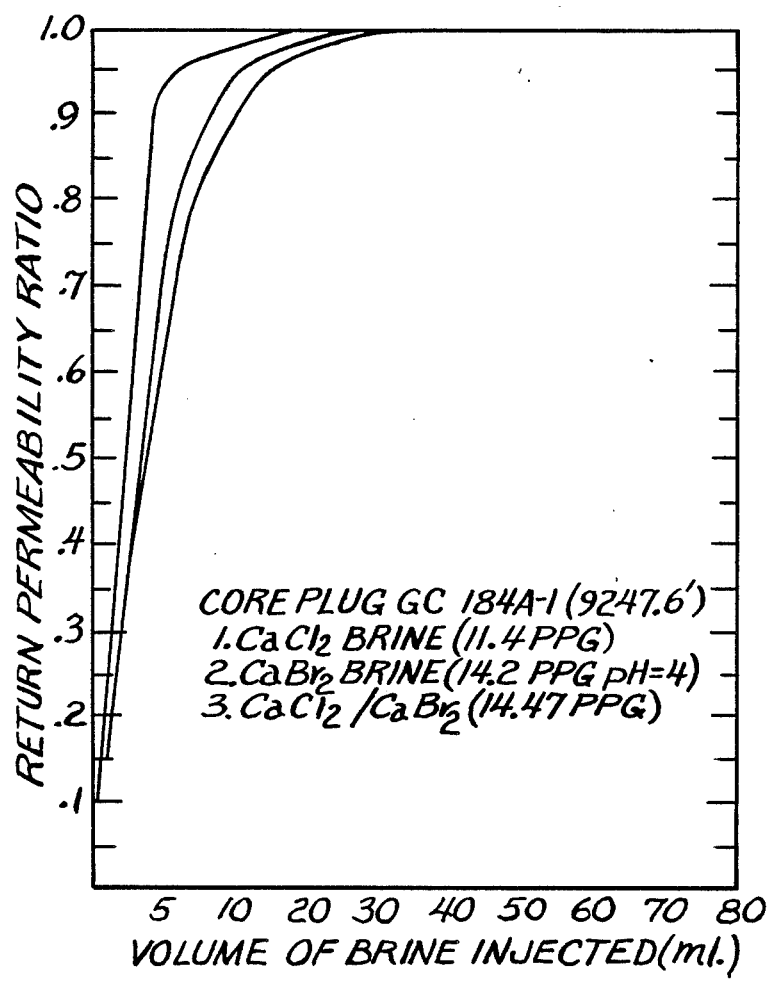
FIG. 2 shows the nature of the return permeability of two core plugs used to obtain data in Example II.
Figure 3:
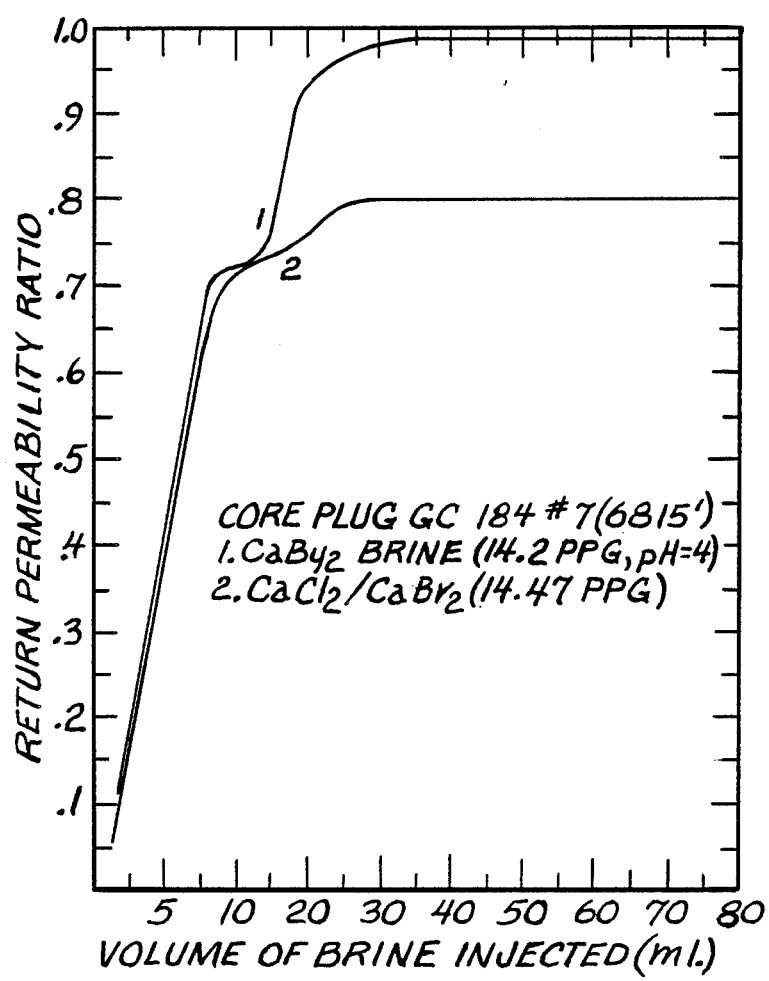
FIG. 3 illustrates the relationship between the return permeability and volume of displacement of a core utilized in Example 2.
Figure 4:
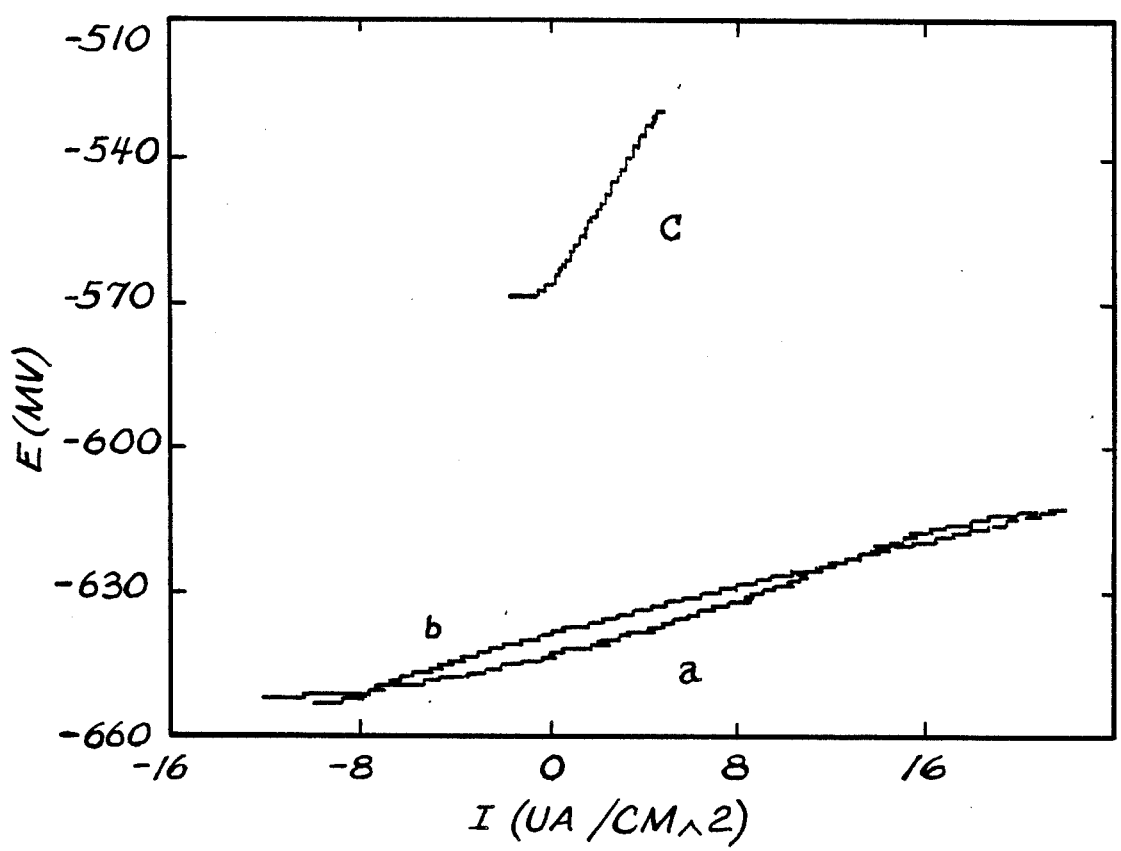
FIG. 4-7 illustrate polarization resistance curves of the various experimental runs.
Figure 5:
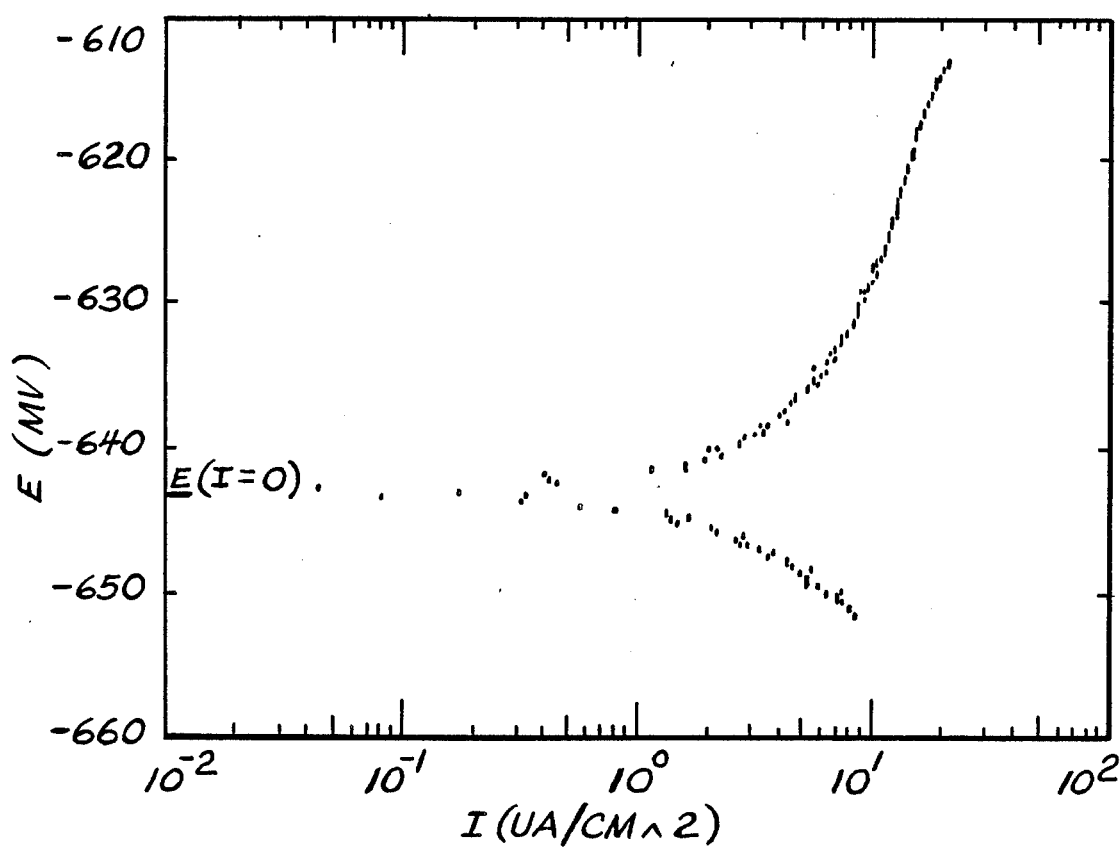
Figure 6:
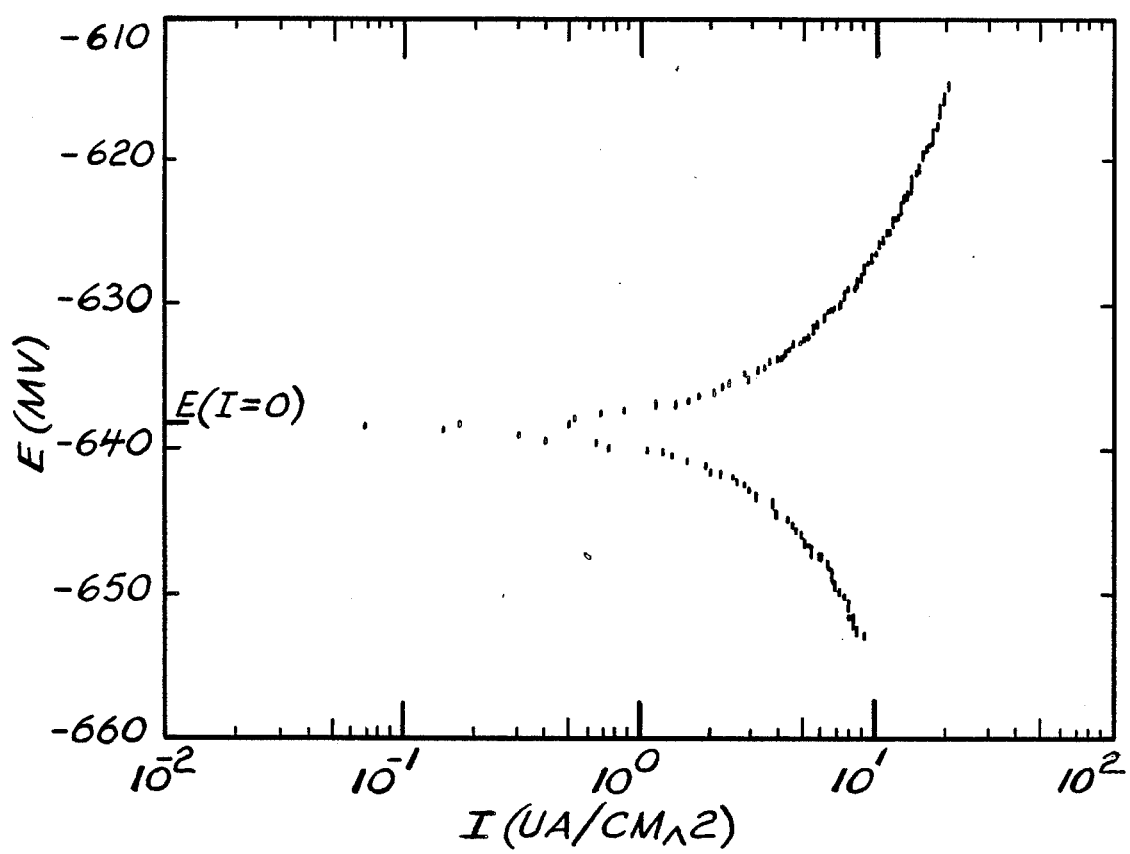
Figure 7:
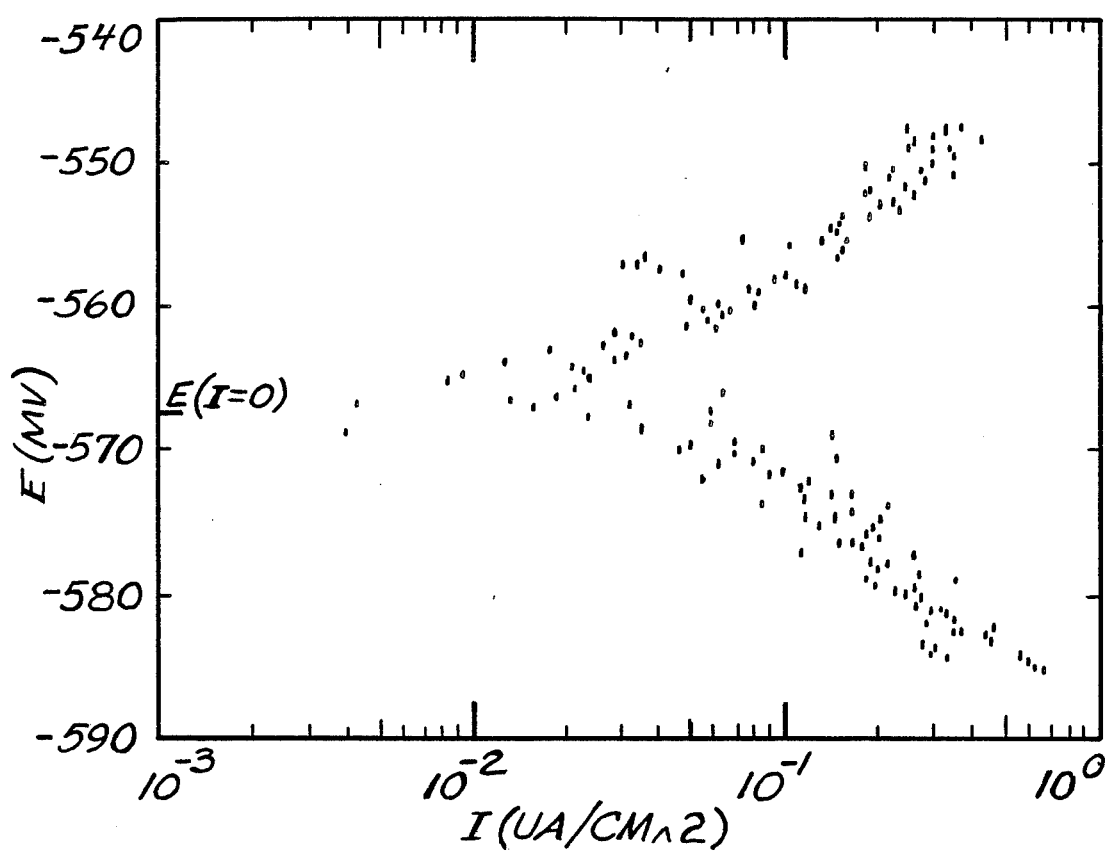

*permeability to 4% NACl solution
[1]CaBr$_2$ Brine, pH adjusted to 4 with acid buffer solution
[2]CaCl$_2$/CaBr$_2$ Brine
[3]CaCl$_2$ Brine The relationship between the return permeability ratios and the volume of displacement is illustrated in FIG. 2. From the Figure, it is evident that in all types of brines the maximum permeability is returned after injection of approximately 40 cubic centimeters of reference brine. The data in Table 2 indicate that approximately 20 percent of permeability is the maximum loss. The data also shows that unfavorable brine-matrix interaction can be curtailed by the use of brine buffered to a pH of about 4.

Corrosion Tests

To determine if the lowering of the pH of a brine with an acid would increase the corrosivity of the brine, two sets of tests were performed. Weight loss corrosion rate tests along with electrochemical polarization experiments were performed. K-55 tubular steel was placed for one week in a calcium bromide brine buffered to a pH of 4 at 150° F. Stock 14.2 ppg calcium bromide buffered with acetic acid/sodium acetate and a similar solution with a corrosion inhibitor such as a filming amine, or an inorganic sulfur containing salt or a mercaptan, was prepared and placed in a corrosion cell with metal to be tested. The results of these experiments are listed in Table 3. The results indicate few, if any, corrosion related problems exist in uninhibited and inhibited brains.

TABLE 3

Weight Loss Corrosion Rate Tests, 7 day, 150° F., K-55 Steel

| Solution | Treatment | pH$_i$ | pH$_f$ | Weight Loss (mg) | C.R. (m.p.v.) |
|---|---|---|---|---|---|
| 14.2# CaBr$_2$ | Blank | 6.5 | 6.15 | 5.6 | 0.57 |
| 14.2# CaBr$_2$ | Blank | 6.5 | 6.15 | 7.5 | 0.76 |
| 14.2# CaBr$_2$ | HCl/pH4 | 4.0 | 5.4 | 11.2 | 1.13 |
| 14.2# CaBr$_2$ | HAc/pH4 | 4.0 | 5.4 | 9.7 | 0.98 |
| 14.2# CaBr$_2$ | HCl/pH4 + inhibitor (filming amine) | 4.0 | 5.4 | 3.3 | 0.33 |

Polarization resistance curves were obtained from experiments run with a stock brine/K-55 System and a buffered/inhibited brine in which the pH of the system was acidic. Either hydrochloric acid or acetic acid were utilized to lower the pH of the system. Results of these electrochemical experiments show acceptable uniform corrosion rates in uninhibited brines until the pH is lowered below 2.0. Density has no effect on the corrosion rate. The addition of an inhibiting agent in the system provides a decrease in the corrosion rate of the metal. Electrochemical potential results are listed in Table 4. All solutions designed by 14.2# are calcium bromide solutions, whereas the solution designated by 13.2# is a calcium chloride/calcium bromide solution. Polarization resistance curves showing typical results are shown in FIGS. 4–7.

TABLE 4

Electrochemical Corrosivity Determinations, K-55 Metal/14.2 ppg CaBr$_2$

| Solution | pH | T (°F.) | E$_{corr}$ vs. S.C.E. (mv) | Taffell βa (mv) | Slopes βc (mv) | I corr (μa/cm$^2$) | C.R. (mpy) |
|---|---|---|---|---|---|---|---|
| 14.2# | 6.35 | 80 | −497 | 36 | 21 | 1.6 | .72 |
| 13.2#/HCl | 3.55 | 80 | −517 | 26 | 21 | 1.5 | .68 |
| 14.2# | 6.35 | 150 | −632 | 171 | 17 | 3.9 | 1.80 |
| 14.2# | 6.35 | 150 | −620 | 171 | 76 | 2.3 | 1.10 |
| 14.2#/HAc | 4.05 | 150 | −619 | 26 | 31 | 7.1 | 3.30 |
| 14.2#/HAc | 4.05 | 150 | −638 | 30 | 34 | 3.3 | 1.50 |
| 14.2#/HAc | 4.05 | 150 | −622 | 63 | 46 | 2.0 | .91 |
| 14.2#/HAc | 4.05 | 160 | −651 | 26 | 35 | 3.4 | 1.60 |
| 14.2#/HAc | 1.80 | 160 | −582 | 29 | 35 | 25.9 | 12.00 |
| 14.2#/HAc + Inhibitor | 4.05 | 150 | −563 | 12 | 2 | <.01 | <.01 |
| 14.2#/HAc + Inhibitor | 4.05 | 150 | −565 | 5 | 4 | <.01 | <.01 |
| 14.2#/HAc + Inhibitor (inorganic sulfur containing salt) | 1.80 | 160 | −529 | 23 | 22 | 0.9 | 0.42 |

From the foregoing description, one skilled in the art can easily ascertain the essential characteristics of this invention and without departing from the spirit and scope thereof can make various changes and modifications of the invention to adapt it to various usages and conditions.

I claim:

1. A method of preventing potential subterranean formation damage caused by calcium based completion and well servicing brines comprising adding an acid buffer composition comprised of a weak acid and its conjugate mental salt to said completion and well servicing brine to maintain the pH of said brine between approximately 3.5 and 5.5.

2. A method, as claimed in claim 1, wherein the weak acid and its conjugate metal salt is selected from the group consisting of acetic acid/sodium acetate mixtures, acetic acid/calcium acetate mixtures, and citric acid/sodium citrate mixtures.

3. A method, as claimed in claim 1, wherein the pH of said brine is maintained between 4.9 and 5.0.

4. A method of preventing potential subterranean formation damage in oil and gas wells in which calcium based completion and well servicing brines are pumped into said wells, the improvement comprising maintaining the pH of said brine between 5.5 and 3.5 by adding an acid buffer composition comprised of a weak acid and its conjugate metal salt to said brine.

5. A method, as claimed in claim 4, wherein the acid buffer composition is selected from the group consisting of acetic acid/sodium acetate mixtures, acetic acid/calcium acetate mixtures, and citric acid/sodium citrate mixtures.

6. A method, as claimed in claim 4, wherein the pH of said brine is maintained between 4.0 and 5.0.

* * * * *

UNITED STATES PATENT AND TRADEMARK OFFICE
CERTIFICATE OF CORRECTION

PATENT NO. : 4,938,288   Page 1 of 3

DATED : Jul. 3, 1990

INVENTOR(S) : Kenneth L. Bridges

It is certified that error appears in the above-identified patent and that said Letters Patent is hereby corrected as shown below:

Column 1, at Line 22, delete after the term swelling "ard" and substitute therefor -- "and" --.

Column 1, at Line 52, delete after the term when "trines" and substitute therefor -- "brines" --.

Column 1, at Line 54, delete after the term calcium "broxide" and substitute therefore -- bromide --.

Column 2, at Line 61, delete after the term to "the" and substitute therefor -- "be" --.

Column 2, at Line 67, delete after the term formation "daxage" and substitute therefor -- "damage" --.

Column 4, at Line 14, delete after the term is "adjustei" and substitute therefor -- "adjusted" --.

Column 4, at Line 27, delete after the term The "preferrei" and substitute therefor -- "preferred" --.

UNITED STATES PATENT AND TRADEMARK OFFICE
CERTIFICATE OF CORRECTION

PATENT NO. : 4,938,288

DATED : Jul. 3, 1990

INVENTOR(S) : Kenneth L. Bridges

It is certified that error appears in the above-identified patent and that said Letters Patent is hereby corrected as shown below:

Column 4, at Line 50, delete after the term initial "permeabllity" and substitute therefor -- "permeability" --.

Column 4, at Line 63, delete after the term Return "Permeability" and substitute therefor -- "Permeability" --.

Column 5, at Line 2, delete after the term Return "Permeability" and substitute therefor -- "Permeability" --.

Column 5, at Line 68, delete after the term inhibited "brains" and substitute therefor -- "brines"--.

Column 6, at Line 6, delete after the abbreviation C.R. "(m.p.v.)" and substitute therefor -- "(m.p.y.)" --.

UNITED STATES PATENT AND TRADEMARK OFFICE
CERTIFICATE OF CORRECTION

PATENT NO. : 4,938, 288

DATED : Jul. 3, 1990

INVENTOR(S) : Kenneth L. Bridges

It is certified that error appears in the above-identified patent and that said Letters Patent is hereby corrected as shown below:

Column 6, Line 64, delete after the term conjugate "mental" and substitute therefor -- metal--.

Column 7, at Line 5, delete after the term between "4.9" and substitute therefor -- "4.0" --.

Signed and Sealed this

Twenty-sixth Day of November, 1991

Attest:

HARRY F. MANBECK, JR.

*Attesting Officer*  *Commissioner of Patents and Trademarks*